Figure 1:
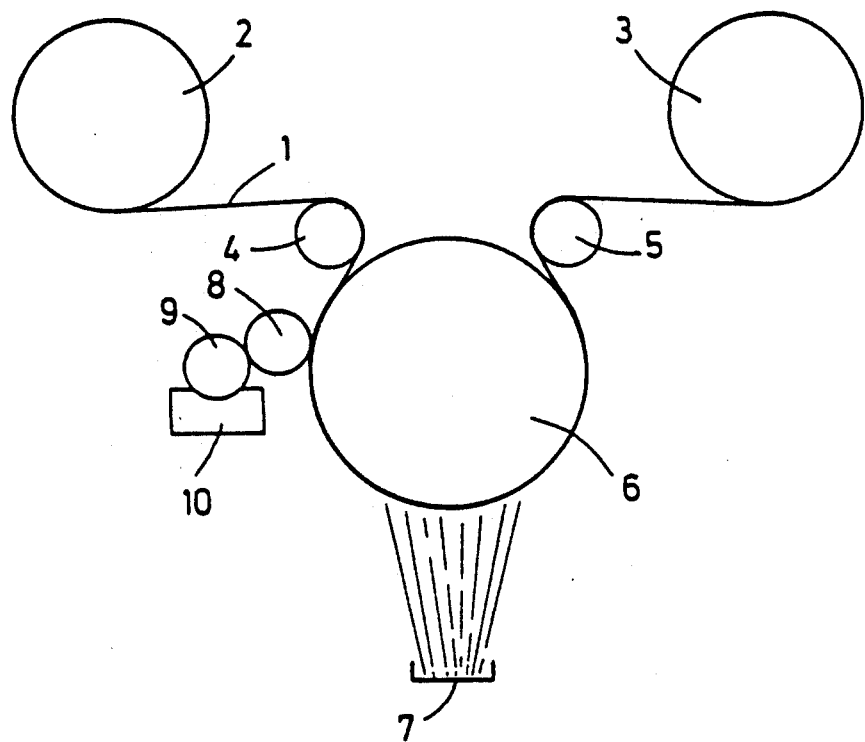

United States Patent [19]

Steiner

[11] Patent Number: 5,136,462
[45] Date of Patent: Aug. 4, 1992

[54] FOIL WITH VACUUM VAPOR DEPOSITED METAL COATING

[75] Inventor: Holger Steiner, Erndtebrück-Schameder, Fed. Rep. of Germany

[73] Assignee: Steiner GmbH & Co. KG, Erndtebruck, Fed. Rep. of Germany

[21] Appl. No.: 676,978

[22] Filed: Mar. 29, 1991

[30] Foreign Application Priority Data

Apr. 3, 1990 [DE] Fed. Rep. of Germany ....... 4010753

[51] Int. Cl.$^5$ .................... H01G 4/24; H01G 7/00; C23C 13/02
[52] U.S. Cl. .................... 361/273; 29/25.42; 427/81
[58] Field of Search .................... 29/25.42; 427/43, 79, 427/81; 361/303, 304, 305, 272, 273, 275

[56] References Cited

U.S. PATENT DOCUMENTS

| 2,138,892 | 12/1938 | Sträb et al. ..................... 361/273 |
| 2,216,558 | 10/1940 | Ortlieb ..................... 361/275 |
| 4,694,377 | 9/1987 | MacDougall et al. ............. 361/275 |
| 4,749,591 | 6/1988 | Ronchi ..................... 427/79 |
| 4,832,983 | 5/1989 | Nagatomi et al. ..................... 427/81 |

FOREIGN PATENT DOCUMENTS

| 1150762 | 3/1960 | Fed. Rep. of Germany . |
| 1263449 | 3/1968 | Fed. Rep. of Germany . |
| 2658765 | 7/1978 | Fed. Rep. of Germany . |

Primary Examiner—Donald A. Griffin
Attorney, Agent, or Firm—Herbert Dubno

[57] ABSTRACT

A capacitor of the self-healing type having a metallic coating which is vapor-deposited under vacuum and provided with a plurality of minute apertures therein which are configured as narrow slots rounded at their ends which subdivide the metallic coating into surface elements small in area, and at there ends there are bridges of smaller width which conductingly connect the surface elements.

8 Claims, 2 Drawing Sheets

FOIL WITH VACUUM VAPOR DEPOSITED METAL COATING

The present invention relates to a film for the manufacture of self-healing capacitors with a metallic coating vapour-deposited under vacuum, divided up by apertures, provided as an electrode, as well as a self-healing capacitor manufactured from the film. In the manufacture of self-healing capacitors, it has been found that the desired effect of the burning away of the vapour-deposited metallic coating, around the disruptive discharge locations of the dielectric, is not achieved in every case; the short-circuit currents which arise from a disruptive discharge cannot be adequate for this purpose, but mostly they exceed the current required for the "healing" and can give rise to additional heating, which can detract from the voltage stability of the dielectric, as well as other disturbances.

In order to avoid short-term or longer-lasting substantial excess currents, this type of capacitor is furnished with safety fuses or also with circuit breakers. With circuit breakers, it is assumed that, in the case of over-powerful disruptive discharges, the evolution of gas can occur, which distorts the capacitor housing that is elastically held in position, for example by impressed crimping, in such a way that, because of this, at least one of the leads to the reel will be pulled out from it or else pulled off from it. It is found here that it is a disadvantage that the excess pressure which arises from a disruptive discharge in the capacitor housing must exert its influence between the reel and the floor or the housing which carries the circuit-breaker mechanism in order to achieve the desired result. On the other hand, once again, the containers for the capacitor must be fabricated of such strength that, even in the case of oil-filled capacitors, the bursting of the container will be avoided. The employment of safety fuses has also been found to present problems because these demand a high tripping current which is generally not attained even with powerful disruptive discharges.

It has been shown to be a disadvantage that, for minimising of the results of high short-circuit- and complete-healing-currents, the overvoltage protection of the dielectric can only be exploited at a very low percentage rate, which results in spatially large, extended capacitors, the dielectric of which is loaded to the extent of only a small fraction of its actual dielectric strength.

A number of proposals have already been made for special development of the metallic coating to achieve higher load-carrying capacity and improved self-healing performance. Thus, according to the European Patent EP-A1-0 243 288, a metal coating has been proposed which is divided up, in the longitudinal direction of the film, by means of slots which extend substantially across its entire width, and which is thickened at the connection end to facilitate the connection, and in which at least one of the two capacitor layers, in the region of the ends of the dividing slots, is fabricated with reduced thickness. The object to be achieved in this way is that, in the case of an imperfect distribution, the root regions of the cross tongues of the metallic coating which are actually made with reduced thickness will burn through and thereby the entire cross tongue involved will be separated. However, it has been found to be a disadvantage that a metallic coating with such differences in thickness is difficult to apply and the desired tolerances are easily exceeded, and inconveniently it is additionally observable that, with the burning through of one root region there will be a not-insubstantial reduction of capacity of the capacitor by the break-down of any one particular cross tongue.

It is much simpler to apply the entire metallic coating with reduced thickness in order to limit short-circuit- and complete-healing-currents by means of the therewith increasing resistance. However it has been shown to be a disadvantage that, with decreasing thickness of the coating, there is the increasing risk of damage to the coating, which can not only be caused by mechanical stresses but also by corrosive influences which can already occur during processing or during storage.

It has also been proposed already that, in addition to a dividing up into cross tongues by slots along the length of the foil, the root regions of the cross tongues are pinched off right down to narrow webs of the connection-metallising, so that, even with a metallic coating applied with uniform thickness, there exists the possibility of burn out of the connections of the cross tongues. This arrangement can be regarded as if each of the cross tongues were connected with the connection metallising by way of the safety fuses formed by narrowing of the metallic coating. Here too it has been found to be a disadvantage that, in the case of complete-healing, any particular entire cross tongue, and therewith a relatively large surface area, are switched off and thus an inconveniently high loss of capacity occurs each time. A more comprehensive subdivision into narrower cross tongues certainly reduces the capacity losses each time there is a breakdown, but the increased number of cross slots which occur because of this reduces the capacity which can be achieved with the surface area of the dielectric.

In the case of slots subsequently incorporated in the usual manner, it unfortunately becomes apparent that with electrical burn-outs, for example according to the German Offenlegungsschrift DE-OS 24 15 409, or with the mechanical introduction of slots according to the German Auslegeschrift DE-AS 1 150 765, relatively uncontrollable metallic regions always remain which, because of residual metal peaks, can give rise to relatively high local field strengths.

The invention is therefore based upon the problem of creating a foil of the type described generically in the Patent Claim 1 for the manufacture of self-healing capacitors, the metallic coating of which is divided up by means of metal-free slots, and in that the currents which are necessary for ensured seal-healing are lowered and, on the other hand, excessive discharge currents are limited, without the possibility, in the case of a breakdown, of substantial capacity losses occurring, so that the voltage loading of the dielectric can be augmented.

This problem can be solved by making use of the features set out in Patent Claim 1. Because of the configuration of the apertures as narrow slots, the metallic coating of the foil which forms the electrodes can be divided up into surface elements of small area, so that in the case of breakdown of such a surface element, there will be only a relatively small loss of capacity. Each of the subdividing slots end at bridges which connect together surface elements, said bridges being so narrow that they will burn through when excessive healing currents occur. By appropriate choice of the number of these bridges and continuation from surface element to surface element, the effect is achieved that it is only at the surface element involved that the bridges, which form the current narrows, and thus act as safety fuses, are destroyed, but the rest of the surface elements remain connected to the connection region.

It has been demonstrated that it is essential, for the production of definitelyshaped slots which divide up the metallic coating, that they should be created by the application of a masking oil in accordance with the U.S. Pat. No. 4,832,983 by means of an patterned application roller before the vapour-deposition of the metallic coating.

Additional developmental features are to be found in the subordinate Patent Claims.

Figure 2:
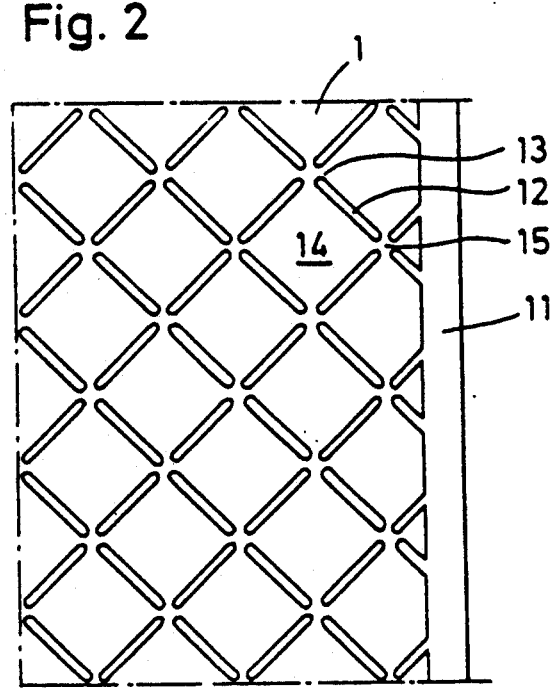

Examples of embodiment of the invention will be described in greater detail with reference to the accompanying drawings, in which:

FIG. 1 is a diagrammatic representation of the arrangement for the application of a locally-interrupted metallic coating to a film, FIG. 2 is a portion of film vapour-deposited with the arrangement depicted in FIG. 1, and its metallic coating is subdivided by slots in such a manner that between the surface elements of smaller size there are current-conducting narrow bridges remaining, and FIG. 3 to FIG. 6 depict portions of additional subdivided metallic coatings on foil produced with the arrangement according to FIG. 1.

An arrangement is depicted in FIG. 1 with which a film, for example a preferably double-laid web of paper, but generally a film of synthetic plastics material, for example of polypropylene or polyester, is provided with a locally delimited thin metallic coating. For this purpose the film 1 is unrolled from a supply roller 2 and is finally rolled up again on a take-up roller 3. Between the supply roller 2 and the take-up roller 3, the film passes over deflecting rollers 4 and 5 and around the cooling roller 6. Opposite to the cooling roller there is a vapour generator 7 which is able to produce, after heating under vacuum, metallic vapours, for example aluminium- or zinc-vapour or the like. In addition to this known conventional type of vapour-producing equipment, there is a pressure roller 8 in contact with the film passing around roller 6, said roller 8 being preferably constructed from soft material or having a coating of soft material upon the surface of which there is a raised pattern corresponding to the slots which are to remain free from metal. From the supply tank 10 by way of the transfer roller 9, the raised portions of the jacket of roller 8 have a substance applied to them, which can be vaporised by heating, for example an inorganic or organic oil.

When the film 1 is passing through the vaporisation zone, around the periphery of the cooling roller 6 and opposite to the vapour generator 7, the substance applied to the film, for example an oil, is volatilised in these regions and thus prevents the access of the metallic vapour given off by the vapour generator 7 so that a deposit of metal cannot be formed and therefore, depending upon the profiling of the pressure roller 8 upon the film 1, a metal-free pattern is developed. In this way the specific equipment required for this procedure can, without further ado or difficulties, be added onto the known vapour-producing equipment, so that evacuation and working under vacuum, or high vacuum, in common is possible in one pass through the assembly.

The pattern produced by means of the pressure roller 8 can be designed in any desired manner and substantially without sharp corners or even serrated edges, so that the regions remaining free from metal are clear and do not display structured edges in the desired arrangement. The method of fabrication is also distinguished by the fact that there are no limitations whatsoever with regard to the types of metal to be vapour-deposited, any desired form of metallising is prescribable and also every conventional type of vapour production can be adopted. Furthermore, the method is suitable for all dielectric substances and allows for modified metal application without damage or danger to the film.

As already explained, these types of modified metallised films can be utilised for the manufacture of self-healing capacitors. In accordance with the present invention, the metallising of the film is developed in such a manner that only relatively small surface elements are almost completely surrounded by elongated and round-ended slots and they are connected to neighbouring surface elements by way of relatively narrow bridges remaining between the ends of the slots. The surface elements can, by way of example, possess a surface area diminished by one or more powers of ten when compared with known types of tongues. Therewith, on the one hand, not only excessive field strengths such as occur during the self-healing process which affect the dielectric strength of the dielectric are avoided and, on the other hand, they determine that there will be only a slight reduction in capacity because of wide separation of failed surface elements.

A metallising pattern which can be effected by means of the pressure roller 8 is depicted in FIG. 2, which will satisfy the demands which can be made upon self-healing capacitors. In the utilisation of such a pattern, the specific dielectric loading can be increased to practically double the former conventional value, so that with a prescribed dielectric, a self-healing capacitor fabricated with this pattern can be operated at practically double the voltage that was formerly generally employed.

FIG. 2 is a view of portion of a capacitor film 1 which was provided with a metallic coating by means of equipment similar to that shown in FIG. 1. Originally printed with oil, and therefore remaining without metallic coating, there are elongated slots 12 in the form of narrow rectangles with semi-circular rounded ends. The metallic coating consists of the thicker connection strip 11 and essentially of the relatively small surface elements 14 which are arranged in a rhombic grid design and their corners are connected to neighbouring elements by way of bridges 15. If it comes here to the stage of a failure with excessively strong currents, then these load the four bridges 15 of the affected surface element 14 and burn through them so that the surface element is separated from the metallic coating. The neighbouring elements which could be reached by way of the bridges each take up only part of the current and transmit it further by way of an equal number of bridges, each of which are thus only loaded with a portion of the current required to destroy a bridge and so they remain unimpaired. In this way only the bridge of a single surface element are interrupted and only this one small-sized surface element is switched off. With the previous application of oil, the effect is achieved that, within the narrow slots 12 in the case of undamaged film, any metallising of them is absent and, because of the substantially elongated shape of their flanks in combination with the semicircular rounded ends, any peak field strengths during use of the capacitor are largely suppressed.

Figure 3:
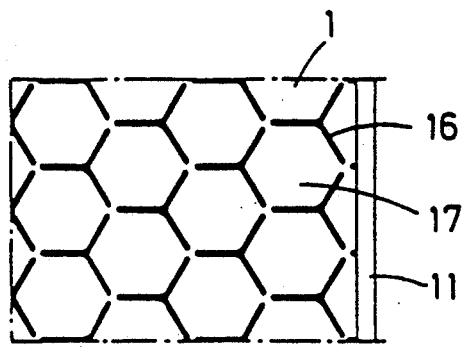

The shape of the metallic coating of a film used for the manufacture of capacitors is, however, not restricted to designs in accordance with FIG. 2. It has been found essential for sharp corners to be avoided and for surface elements of small dimensions to be created which are connected to neighbouring surface elements by way of at least one, and preferably several bridges. According to FIG. 3, it is possible to produce honeycomb structures with slots 16 remaining free from metal, so that each surface element 17 has the shape of a regular hexagon which is surrounded by six elongated metal-free slots, so that each surface element is connected to six neighbouring surface elements by way of six bridges. However, the possibility also exists, for example, that the slots as depicted in FIG. 3 can be configured as three elongated slots 16 arranged in directions at 120° to each other and joined together at a central point so that each surface element 17 is connected to neighbouring surface elements by way of only three bridges.

Figure 4:
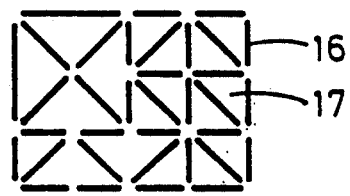
Figure 5:
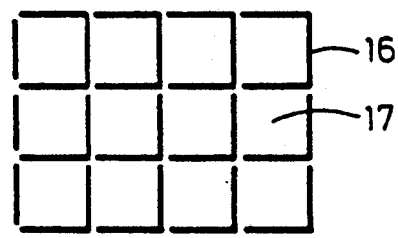
Figure 6:
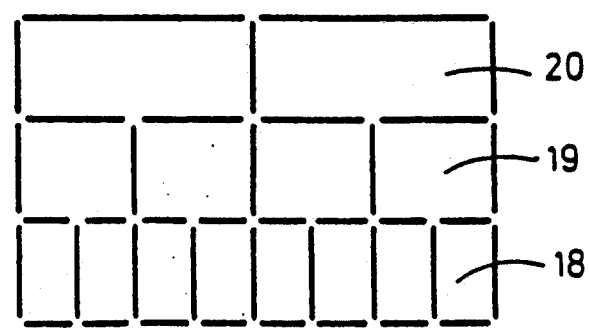

In a similar fashion, it is also possible to have surface elements in the shape of triangles as depicted in different distributions in FIG. 4, or else in the shape of squares as shown in FIG. 5. According to FIG. 6, the possibility also exists of altering the size of the elements across the width of the film so that, for example, small surface elements are available on the connection side of the film and these are followed across the width of the film by larger surface elements, whilst on the far side of the film there are surface elements available which also have increased length. In this situation, the invention is neither restricted to a stepped change over three different lengths of surface elements nor to the condition that the smaller surface regions 18 should be located along the connection side of film 1. Furthermore, it is possible to have surface elements which do not conform to shapes given in the various examples. The essential thing is that all the surface elements should be small in size and should be separated from each other by metal-free slots in such a manner that each surface element is provided with at least one, preferably two or three, bridges to neighbouring surface elements. In every one of these cases, there is optimisation of material usage in the fabrication of self-healing capacitors, with simultaneous improvement of the reliability, so that, especially when the metallising is carried out with a zinc-aluminium alloy, in accordance with the European Patent Specification 88 137, the capacitor fabricated from the film, when compared with known capacitors having the same dielectric, can be operated at double the voltage. Even overloading right up to complete failure are possible; these occur without danger by successive switching off of surface elements due to burning through of bridges, without overloading, especially pressure loading, occurring, which visibly deforms the capacitor container.

The claims defining the invention are as follows:

1. A film for the manufacture of self-healing capacitors with a metallic coating vapour-deposited under vacuum, divided up by apertures, provided as an electrode, wherein the apertures are configured as narrow slots rounded at their ends, which subdivide the metallic coating into surface elements small in area, and at their ends there are bridges of smaller width which conductingly connect the surface elements.

2. The film according to claim 1, wherein each surface element is connected to neighbouring surface elements by at least two bridges.

3. The film according to claim 1, wherein it is provided with curved, elongated and/or branched strip-shaped slots.

4. The film according to claim 1, wherein the slots have simple or multi-angled strip shapes.

5. The film according to claim 1, wherein the surface elements are unequal in shape and/or size.

6. The film according to claim 1, wherein it is provided on both sides with a metallic coating each corresponding to a capacitor electrode.

7. Method for the manufacture of a film according to claim 1, wherein an applied substance which is to be evaporated from the film is applied to the stamping or pressure roller from a supply tank by a transfer roller.

8. A self-healing capacitor, wherein it is fabricated from a film according to claim 1.

* * * * *